United States Patent

(12) United States Patent
Liu

(10) Patent No.: US 12,231,397 B1
(45) Date of Patent: Feb. 18, 2025

(54) TECHNIQUES FOR MANAGING A MEDIA ACCESS CONTROL ADDRESS OF A CLIENT DEVICE FOR COMMUNICATION WITH AN ACCESS POINT

(71) Applicant: TP-LINK CORPORATION PTE. LTD., Singapore (SG)

(72) Inventor: Bolun Liu, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/410,496

(22) Filed: Jan. 11, 2024

Related U.S. Application Data

(63) Continuation of application No. 18/505,155, filed on Nov. 9, 2023, now abandoned.

(51) Int. Cl.
| | | |
|---|---|---|
| *G06F 13/00* | (2006.01) | |
| *H04L 9/40* | (2022.01) | |
| *H04L 61/5053* | (2022.01) | |
| *H04L 101/622* | (2022.01) | |

(52) U.S. Cl.
CPC ...... *H04L 61/5053* (2022.05); *H04L 63/0428* (2013.01); *H04L 2101/622* (2022.05)

(58) Field of Classification Search
CPC ............. H04L 61/5053; H04L 63/0428; H04L 2101/622; H04L 2101/618
USPC .......................... 709/245, 223, 224; 713/502
See application file for complete search history.

(56) References Cited

U.S. PATENT DOCUMENTS

| | | | | |
|---|---|---|---|---|
| 8,248,922 | B2 * | 8/2012 | Rose | ...................... H04L 45/00 370/222 |
| 11,064,428 | B2 * | 7/2021 | Koizumi | ............... H04W 12/06 |
| 11,356,923 | B2 * | 6/2022 | Desai | .................. H04W 12/088 |
| 2008/0205418 | A1 * | 8/2008 | Rose | ...................... H04L 45/00 370/401 |

(Continued)

FOREIGN PATENT DOCUMENTS

| | | |
|---|---|---|
| CN | 104955038 A | 9/2015 |
| CN | 107666445 B | 9/2021 |

(Continued)

OTHER PUBLICATIONS

Julien Sevin et al., "Obfuscation of Multiple CPE Parameters", Mar. 13, 2023, doc:IEEE 11-23/0411r0, 13 pages.

*Primary Examiner* — Kenneth R Coulter
(74) *Attorney, Agent, or Firm* — Loeb & Loeb LLP

(57) ABSTRACT

This disclosure provides a method for managing a media access control (MAC) address of a client device for communication with an access point (AP). The method is implemented by the client device and includes: communicating with the AP using a first MAC address of the client device; determining a second MAC address as a changed MAC address of the client device; communicating with the AP using the second MAC address of the client device while continually using the first MAC address of the client device for receiving data packets from the AP for an extended period of time; determining whether the extended period of time elapses based on historical information for transmissions between the client device and the AP; and stopping using the first MAC address of the client device for receiving the data packets from the AP when the extended period of time elapses.

20 Claims, 7 Drawing Sheets

(56) References Cited

U.S. PATENT DOCUMENTS

2020/0037239 A1* 1/2020 Koizumi ............... H04W 48/16
2021/0282069 A1* 9/2021 Desai .................... H04W 12/50

FOREIGN PATENT DOCUMENTS

| CN | 116112927 A | 5/2023 |
| WO | 2023131674 A1 | 7/2023 |

* cited by examiner

TECHNIQUES FOR MANAGING A MEDIA ACCESS CONTROL ADDRESS OF A CLIENT DEVICE FOR COMMUNICATION WITH AN ACCESS POINT

CROSS REFERENCE TO RELATED APPLICATIONS

This application is a continuation of U.S. Non-Provisional patent application Ser. No. 18/505,155, filed on Nov. 9, 2023 and titled "TECHNIQUES FOR MANAGING A MEDIA ACCESS CONTROL ADDRESS OF A CLIENT DEVICE FOR COMMUNICATION WITH AN ACCESS POINT". The entire disclosure of the aforementioned application is incorporated by reference as part of the disclosure of this application.

TECHNICAL FIELD

The present disclosure relates to wireless communication, and more specifically, to techniques of managing a media access control (MAC) address of a client device for communication with an access point (AP).

BACKGROUND

The IEEE 802.11bi task group is working on enhanced data privacy, with the goal of specifying modifications to the 802.11 media access control (MAC) specification to create new mechanisms that address and improve user privacy, such that personal information such as location, movements, contacts and activities can be protected from being tracked.

Among the privacy parameters to be protected under the IEEE 802.11 specification, the MAC address of a target station (such as a smart phone) is a unique identifier associated with the target station and used for over-the-air (OTA) communications between the target station and its serving AP. In order to enhance privacy, the MAC address of the target station can be periodically changed to reduce of the risk of being tracked.

There is a need for an improved mechanism for managing the MAC address of the target station for communication with its serving AP while ensuring the privacy.

SUMMARY

In view of the above problems, the present disclosure provides techniques of managing a media access control (MAC) address of a client device for communication with an access point (AP) while ensuring the privacy.

According to one embodiment of the present disclosure, there is provided a method of managing a media access control (MAC) address of a client device for communication with an access point (AP), the method implemented in the client device and comprising: communicating with the AP using a first MAC address of the client device; determining a second MAC address as a changed MAC address of the client device, the second MAC address being different from the first MAC address; communicating with the AP using the second MAC address of the client device while continually using the first MAC address of the client device for receiving data packets from the AP for an extended period of time; determining whether the extended period of time elapses based on historical information for transmissions between the client device and the AP; and stopping using the first MAC address of the client device for receiving the data packets from the AP when the extended period of time elapses.

According to another embodiment of the present disclosure, there is provided a client device managing a media access control (MAC) address for communication with an access point (AP), the client device comprising: one or more processors; a memory coupled to at least one of the processors; and a set of computer program instructions stored in the memory, which, when executed by at least one of the processors, perform actions of: communicating with the AP using a first MAC address of the client device; determining a second MAC address as a changed MAC address of the client device, the second MAC address being different from the first MAC address; communicating with the AP using the second MAC address of the client device while continually using the first MAC address of the client device for receiving data packets from the AP for an extended period of time; determining whether the extended period of time elapses based on historical information for transmissions between the client device and the AP; and stopping using the first MAC address of the client device for receiving the data packets from the AP when the extended period of time elapses.

According to a yet another embodiment of the present disclosure, there is provided a computer program product for managing a media access control (MAC) address of a client device for communication with an access point (AP), the computer program product comprising a non-transitory computer readable storage medium having program instructions embodied therewith, the program instructions executable by a processor of the client device to cause the processor to: communicate with the AP using a first MAC address of the client device; determine a second MAC address as a changed MAC address of the client device, the second MAC address being different from the first MAC address; communicate with the AP using the second MAC address of the client device while continually using the first MAC address of the client device for receiving data packets from the AP for an extended period of time; determine whether the extended period of time elapses based on historical information for transmissions between the client device and the AP; and stop using the first MAC address of the client device for receiving the data packets from the AP when the extended period of time elapses.

According to yet another embodiment of the present disclosure, there is provided a method of managing a media access control (MAC) address of a client device, the method implemented in an access point (AP) and comprising: communicating with the client device using a first MAC address of the client device; after a second MAC address different from the first MAC address is determined as a changed MAC address of the client device, communicating with the client device using the second MAC address of the client device while the client device continually uses the first MAC address of the client device for receiving data packets from the AP for an extended period of time, wherein whether the extended period of time elapses is determined based on historical information for transmissions between the client device and the AP.

According to yet another embodiment of the present disclosure, there is provided an access point (AP) managing a media access control (MAC) address of a client device, the AP comprising: one or more processors; a memory coupled to at least one of the processors; and a set of computer program instructions stored in the memory, which, when executed by at least one of the processors, perform actions of: communicating with the client device using a first MAC address of the client device; after a second MAC address different from the first MAC address is determined as a changed MAC address of the client device, communicating with the client device using the second MAC address of the client device while the client device continually uses the first MAC address of the client device for receiving data packets from the AP for an extended period of time, wherein whether the extended period of time elapses is determined based on historical information for transmissions between the client device and the AP.

According to a yet another embodiment of the present disclosure, there is provided a computer program product for managing a media access control (MAC) address of a client device, the computer program product comprising a non-transitory computer readable storage medium having program instructions embodied therewith, the program instructions executable by a processor of an access point (AP) to cause the processor to: communicate with the client device using a first MAC address of the client device; after a second MAC address different from the first MAC address is determined as a changed MAC address of the client device, communicate with the client device using the second MAC address of the client device while the client device continually uses the first MAC address of the client device for receiving data packets from the AP for an extended period of time, wherein whether the extended period of time elapses is determined based on historical information for transmissions between the client device and the AP.

At least based on the above embodiments of the present disclosure, an improved mechanism for managing the MAC address of the client device can be realized while ensuring the privacy of the client device and effectively mitigating the packet loss for communication between the client device and its serving AP.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
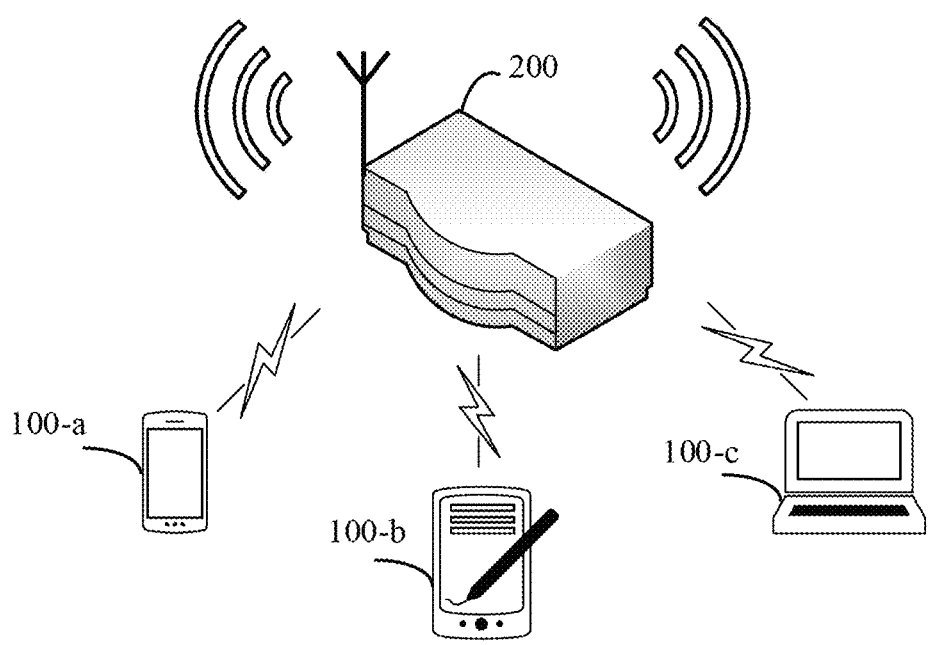
FIG. 1 shows an exemplary architecture for managing a MAC address of a client device according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween.

In the present disclosure, an AP, which may be interchangeably referred to as a wireless access point (WAP), is a communication device that can communicate with a non-AP (e.g., a station (STA) or client device) in a WLAN and that allows the non-AP to connect to a wired network. The AP usually connects to a router (via a wired network) as a standalone device, but it can also be integrated with or employed in the router.

Likewise, in the present disclosure, a non-AP (e.g., a client device or station, which is interchangeably referred to as a STA) is a communication device that can communicate with an AP to obtain various communication services such as voice, video, packet data, messaging, broadcast, etc. The STA can be any device that contains an IEEE 802.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "client device" "wireless client", "user" and "user device" are often used interchangeably.

In the present disclosure, a STA in a WLAN may work as an AP at a different occasion, and vice versa. This is because communication devices in the context of IEEE 802.11 (Wi-Fi) technologies may include both STA hardware components and AP hardware components. In this manner, the communication devices may switch between a STA mode and an AP mode, based on actual WLAN conditions and/or requirements. In various embodiments below, a non-AP STA may refer to a STA in a WLAN that is not implemented as an AP.

FIG. 1 shows an exemplary architecture for managing a MAC address of a client device according to an embodiment of the present disclosure. An illustrative communication system consisting of three client devices (100-a, 100-b, and 100-c) referred to as client device 100 in this paper, and an access point (AP) 200, which can be employed in 802.11 networks. As previously stated, the AP 200 is capable of establishing WLAN communication with the client device 100, enabling it to connect to a wired network. This permits the client device to access a variety of communication services from the internet, including voice, video, packet data, messaging, and broadcast, among others. After the client device 100 successfully associates with the AP 200 through the 802.11 association process, data transfer between the client device 100 and the AP 200 can commence. This allows the client device 100 to transmit and receive data to and from the network through the AP 2W.

The architecture presented in FIG. 1 is purely illustrative and does not impose any limitations on any embodiment of this disclosure. Multiple APs in the network can serve specific sets of associated client devices, and depending on the application requirements and overall network constraints, the number of client devices in each serving set can be greater or less than the three client devices depicted.

As previously mentioned, the IEEE 802.11 bi task group has proposed enhanced data privacy measures, which include periodic or dynamic changes to the MAC address of the target station and other privacy parameters. Such measures aim to reduce the risk of being tracked. The MAC address of a target station, like a smartphone, functions as a unique identifier used for over-the-air (OTA) communications between the target station and its serving AP. To enable over-the-air communication between the client device and the access point, the MAC address of the client device needs to be indicated in the Transmitter Address (TA) field of IEEE 802.11 frames transmitted by the client device. Similarly, the MAC address of the client device should be indicated in the Receiver Address (RA) field of IEEE 802.11 frames meant for the client device as the immediate recipient. When transmitting an IEEE 802.11 frame, the client device sets the TA field as its current MAC address. Conversely, when receiving IEEE 802.11 frames, the client device successfully receives the frame only when the RA field of the incoming 802.11 frames matches its maintained MAC address and discards it otherwise.

Figure 2:
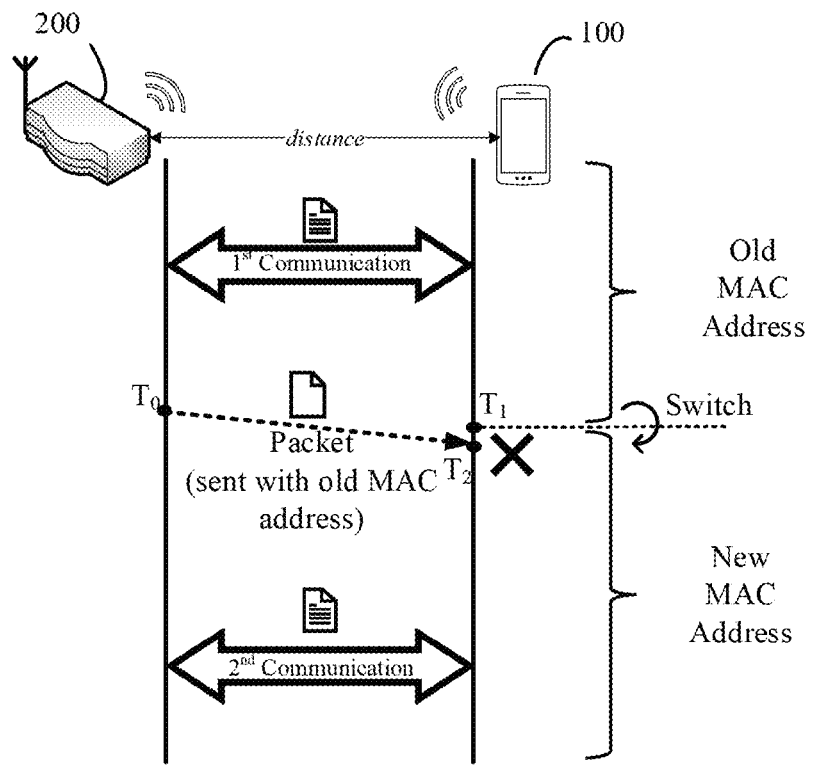
FIG. 2 shows an exemplary schematic diagram illustrating an existing mechanism for changing the MAC address of the client device for ensuring its privacy.

FIG. 2 shows an exemplary schematic diagram illustrating an existing mechanism for changing the MAC address of the client device for ensuring its privacy. As shown in FIG. 2, the client device 100 may be associated with the AP 200, and is able to obtain different communication services from the Internet by communicating with it.

Specifically, for a first period of time before the time point $T_1$, the client device 100 may maintain an old MAC address (e.g., AA-BB-CC-DD-EE-FF) and use the old MAC address for a first communication with the AP 200, including transmitting frames to and receiving frames from the AP 200 based on the currently maintained old MAC address as well as the content of the TA/RA fields of the 802.11 frames to be transmitted or received. Subsequently, for a second period of time after the time point $T_1$, the client device 100 may change its MAC address to a new MAC address (e.g., FF-EE-DD-CC-BB-AA), and after the change, the client device 100 may maintain the new MAC address and use it for a second communication with the AP 20, including transmitting frames to and receiving frames from the AP 200 based on the currently maintained new MAC address as well as the content of the TA/RA fields of the 802.11 frames to be transmitted or received.

The current mechanism for changing the MAC address of the client device as shown in FIG. 2 may have the following defects. Due to a certain distance between the AP 200 and client device 100, there may be a transmission delay (e.g., a period of time for a packet transmitted from the transmitting side to arrive at the receiving side due to the distance) between the communications therebetween, such that a packet transmitted from the AP 200 at a time point $T_0$ may arrive at the client device 100 at time point $T_2$. However, the packet may be transmitted by the AP 200 using the old MAC address of the client device (e.g., by setting the RA field of the frame as the old MAC address), while the current MAC address maintained by the client device 100 is no longer the old MAC address but the new MAC address, so that the client device 100 will discard this packet due to a mismatch between the RA field and the currently maintained MAC address. In this case, a packet loss or connection loss may occur after the MAC change.

Figure 3:
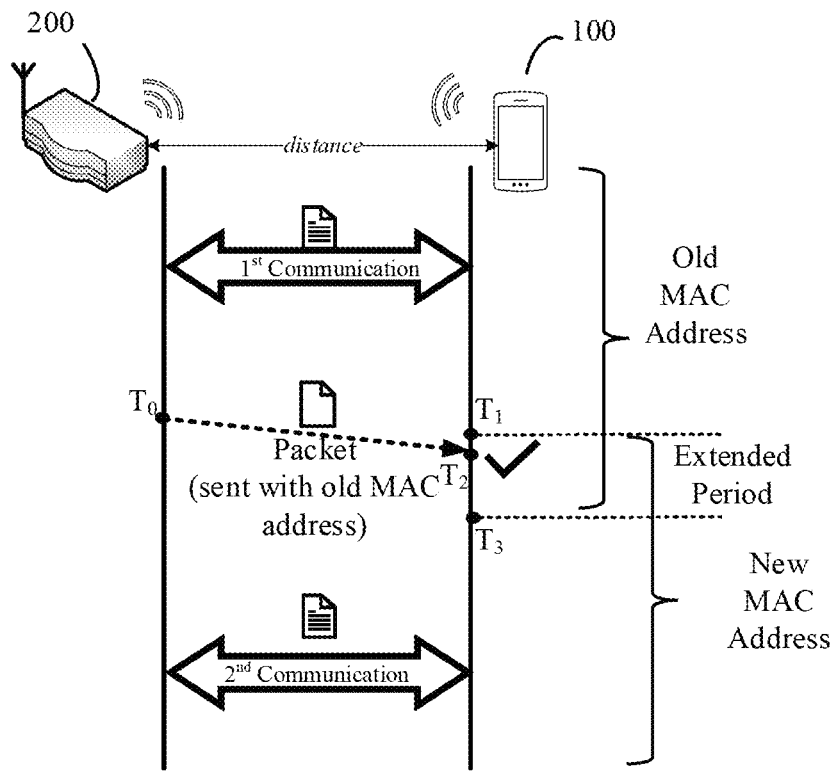
FIG. 3 shows an exemplary schematic diagram illustrating an improved mechanism for changing the MAC address of the client device for ensuring its privacy according to an embodiment of the present disclosure.

FIG. 3 shows an exemplary schematic diagram illustrating an improved mechanism for changing the MAC address of the client device for ensuring its privacy according to an embodiment of the present disclosure. Similar to those shown in FIG. 2, as shown in FIG. 3, the client device 100 may be associated with the AP 200, and can communicate with the AP 200 to obtained various communication services from the Internet.

Similar to FIG. 2, for a first period of time before the time point $T_1$, the client device 100 may maintain an old MAC address (e.g., AA-BB-CC-DD-EE-FF) and use the old MAC address for a first communication with the AP 200, including transmitting frames to and receiving frames from the AP 200 based on the currently maintained old MAC address as well as the content of the TA/RA fields of the 802.11 frames to be transmitted or received. Subsequently, for a second period of time after the time point $T_1$, the client device 100 may calculate a new MAC address (e.g., FF-EE-DD-CC-BB-AA), and upon completion of the calculation, use the calculated new MAC address for a second communication with the AP 200, including transmitting frames to and receiving frames from the AP 200 based on the new MAC address as well as the content of the TA/RA fields of the 802.11 frames to be transmitted or received.

However, unlike the existing mechanism as shown in FIG. 2, after the new MAC address is determined at time point $T_1$, the client device 100 continues maintaining the old MAC address for an extended period of time (e.g., from $T_1$ to $T_3$ as shown in FIG. 3) and stops maintaining the old MAC address only when the extended period of time has elapsed. After the time point $T_3$, only the new MAC address needs to be maintained by the client device 100 for communications with the AP 200. In other words, both the old MAC address and the new MAC address are maintained valid by the client device 100 for an extended period of time after the MAC change, instead of directly replacing the old MAC address by the new MAC address as required by the existing mechanism. In this case, despite the fact that there is a certain distance between the AP 200 and client device 100 and a packet transmitted from the AP 200 at a time point $T_0$ may arrive at the client device 100 at time point $T_2$, the client device 100 can successfully receive the packet since it maintains the two MAC addresses for the extended period of time from $T_1$ through $T_3$. According to the improved mechanism for MAC address change, the packet loss or connection loss for communications between the client device and its serving AP can be effectively mitigated while ensuring the privacy of the client device.

There may be some discussion in 802.11 related proposals that both old and new values for the MAC address are valid during a transition period for the MAC address change, but there is no clear description on why and how to set the transition period and which factors should be considered in the setting, and does not mention what should be done after the MAC change is completed. Inventors of the present disclosure recognize that after the MAC address change, some packets transmitted by the AP using the old MAC address of the client device (e.g., transmitted immediately before the MAC change) are still in the air. In this case, if the client device stops maintaining the old MAC address immediately after the MAC address change, there will be a transmission loss for these packets. On the other hand, if the client device continues maintaining the old MAC address for a long time, additional overhead for maintaining both old and new MAC addresses may occur unnecessarily. Therefore, there may be a tradeoff between the transmission loss for packets transmitted using the old MAC address of the client device and the overhead for maintaining both MAC addresses valid, and accordingly, the extended period of time for continuing maintaining the old MAC address of the client device should be determined appropriately.

In view of this, the present disclosure proposes that the extended period of time for continuing maintaining the old MAC address by the client device is based on historical information for transmissions (e.g., historical transmission delay) between the client device and the AP, such that the defects of packet loss or connection loss in the existing mechanism can be effectively mitigated while not introducing excessive overhead for maintaining both MAC addresses.

According to embodiments of the present disclosure, after a second MAC address (i.e., the new MAC address), which is different from a first MAC address (i.e., the old MAC address) of the client device, is determined as a changed MAC address, it is firstly determined whether an extended period of time for continuing maintaining the first MAC address (e.g., used for receiving data packets from the AP for the extended period of time) has elapsed based on historical information for the transmissions between the client device and the AP. Only when it is determined that the extended period of time has elapsed, the maintaining for the first MAC address of the client device can be stopped.

In an embodiment, the historical information may be representative of historical total transmission length (TTL) information for one or more downlink data packets transmitted from the AP to the client device, e.g., those downlink packets transmitted using the first MAC address of the client device during the first communication between the AP and the client device as shown in FIG. 3. Accordingly, the TTL information may comprise: for each of the one or more downlink data packets, a time difference between a transmission time of the downlink data packet from the AP towards the client device and a receipt time of a feedback information acknowledging the downlink data packet at the AP from the client device. In this embodiment, the determination of whether the extended period of time has elapsed is based on an average of the time differences for the one or more downlink data packets. For example, the round-trip time (i.e., the time interval between the transmission time and the receipt time) can be collected by the AP for 1,000 downlink data packets, and the half of the averaged round-trip time for the 1,000 packets is indicative of the time required for the transmission of the over-the-air packet between the AP and the client device and can be effectively used to predict when the transmissions of data packets from the AP using the first MAC address of the client device will be completed, and thus can be determined as the extended period of time for continuing maintaining the first MAC address.

In another embodiment, the historical information may be representative of historical total transmission length (TTL) information for one or more uplink data packets transmitted from the client device to the AP, e.g., those uplink packets transmitted using the first MAC address of the client device during the first communication between the AP and the client device as shown in FIG. 3. Accordingly, the TTL information may comprise: for each of the one or more uplink data packets, a time difference between a transmission time of the uplink data packet from the client device towards the AP and a receipt time of a feedback information acknowledging the uplink data packet at the client device from the AP. In this embodiment, the determination of whether the extended period of time has elapsed is based on an average of the time differences for the one or more uplink data packets. Similarly, the round-trip time (i.e., the time interval between the transmission time and the receipt time) can be collected by the client device for 1,000 uplink data packets, and the half of the averaged round-trip time for the 1,000 packets can be determined as the extended period of time for continuing maintaining the first MAC address.

It should be noted that the above historical information related to the uplink packets and downlink packets are only provided as illustrative but not limiting examples. The present disclosure does not restrict the type of historical information and the way of obtaining such information. Actually, other types of historical information such as other parameters related to transmission environment of the network can be used, as long as the information can be used to predict when the transmissions of data packets from the AP using the first MAC address of the client device will be completed.

According to embodiments of the present disclosure, as long as the historical information can be determined, the client device can predict a target time of when transmissions of data packets from the AP using the first MAC address of the client device will be completed based on the historical information, and then determines that the extended period of time elapses when the target time is reached. For example, the client device can be configured with a timer for determining whether the extended period of time elapses, which will be described in detail in combination with FIG. 4 and FIG. 5 hereinafter.

Figure 4:
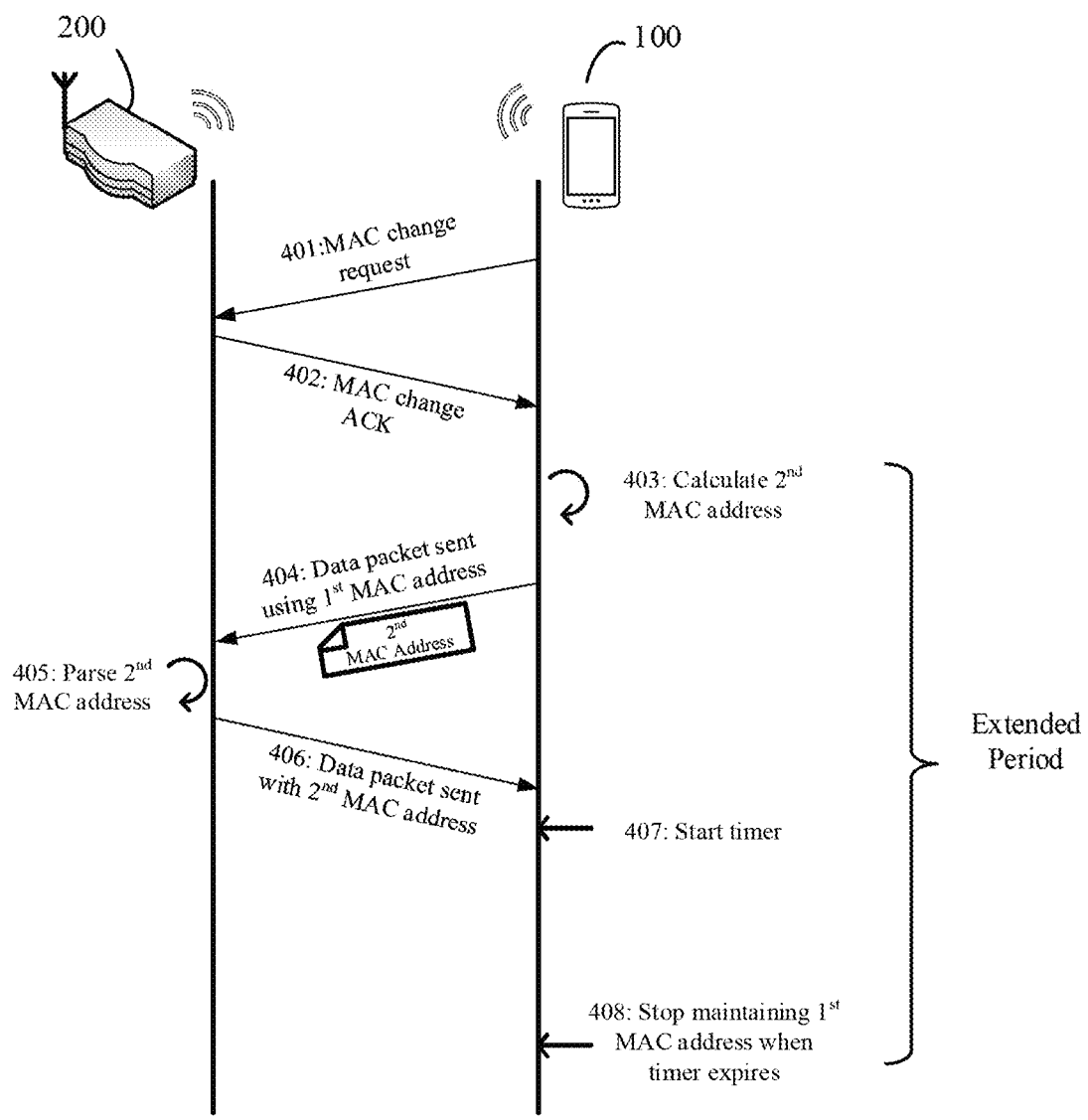
FIG. 4 shows an exemplary schematic diagram illustrating an example of interactions between the client device and the AP for changing the MAC address of the client device for ensuring its privacy according to an embodiment of the present disclosure.

FIG. 4 shows an exemplary schematic diagram illustrating an example of interactions between client device 100 and AP 200 for changing the MAC address of the client device for ensuring its privacy according to an embodiment of the present disclosure.

In this example, the client device can be pre-configured with a timer for determining whether the extended period of time elapses, and the timer may be configured with a predefined duration determined based on the historical information and specifying a time interval before the timer expires (for example, in the order of tens or hundreds of milliseconds, but other values can also be used if appropriate to enables the tradeoff as mentioned above), such that it can be determined that the extended period of time elapses when it is determined that the timer expires. The operations of the timer will be described hereinafter in combination with FIG. 4.

At Step 401, the client device may transmit a MAC change request to the AP, e.g., after the client device is associated with the AP and has communicated with the AP using a first MAC address of the client device for a certain period of time. For example, the client device may transmit a request for changing the first MAC address of the client device to the AP during the communicating with the AP using the first MAC address of the client device, to indicate to the AP that the client device intends to change the currently used MAC address.

It should be noted that the existing mechanism for MAC change does not define a detailed and definite process for initiating the MAC change, for example, regarding how the client device informs the AP that it needs to change the currently used MAC address. By contrast, according to the present disclosure, a new field or reserved field of the 802.11 control frame can be defined to indicate to the AP that the client device needs to change its MAC address. For example, the value of the subtype of the control frame can be set as "0011" to indicate that the client device needs to change the MAC address. In this way, the improved mechanism for the MAC change of the present disclosure does not require significant changes to the existing 802.11 specification, but only needs to add some definitions for new or reserved fields of the control frame, and thus can be easily compatible with the IEEE 802.11 specification, enabling simpler iterative upgrade, better compatibility and lower requirement for the AP.

At Step 402, the AP may transmit a feedback message to the client device for acknowledging receipt of the MAC change request.

In this step, the acknowledging mechanism is proposed in the MAC change process in order to avoid the situation that the client device blindly changes its MAC address without informing the AP side. Thus, the MAC change process can proceed only when the MAC change request is confirmed by the AP. Otherwise, if the acknowledge message is not received by the client device within a reasonable time period, the client device may deem that the current MAC change request is not successful and resend the request at a later time.

At Step 403, the client device may determine the second MAC address of the client device as the changed MAC address of the client device after receipt of the feedback message from the AP acknowledging the request.

In this step, the client device may compute the second MAC address in various manners. For example, the second MAC address may be a transient MAC address computed by the client device through MAC address randomization. It should be noted that other approaches for MAC address computation are also contemplated in the present disclosure.

At Step 404, at the beginning of the MAC change process, the client device may transmit an uplink data packet with the determined second MAC address carried therein, and the packet may be transmitted to the AP using the first MAC address of the client device.

In this step, contrary to some 802.11 related proposals suggesting that both the AP and client device are required to calculate the new MAC address using a shared computation function (e.g., a shared pseudo-random function or shared parameters involved in the computation) to update the MAC address of the client device in a synchronized and implicit way, the present disclosure proposes an explicit way of transfer of the new MAC address calculated by the client device. Specifically, only the client device calculates the new MAC address and explicitly carries the content of the new MAC address in a subsequent data frame to be sent to the A, such that AP can unambiguously know the new MAC address of the client device without the need to calculate it again. In this way, the way of explicit transfer of the new MAC address can be easily implemented algorithmically, and may also avoid errors that may occur if there is any inconsistence between the calculations performed at both the client device and the AP in the existing implicit implementation, such as deviations in the shared computation function or parameters used in the calculation and therefore the outcomings of the calculations at different computing entities, which otherwise may lead to packet loss or connection loss for the communications.

At Step 405, upon receipt of the uplink data frame sent from the client device using the first MAC address, the AP may process and parse the received packet to determine the second MAC address calculated by the client device and intended to be used by the client device for future communications with the AP.

At Step 406, after parsing the second MAC address, the AP may transmit a downlink data packet using the second MAC address of the client device, e.g., by setting the RA field of the downlink data packet as the parsed second MAC address.

At Step 407, after the receipt of the downlink data packet, the client device may start communications with the AP using the second MAC address of the client device, including transmitting frames to and receiving frames from the AP based on the new MAC address, for example, the client device may transmit one or more subsequent uplink data packets to the AP using the second MAC address of the client device. It should be noted that for a certain short period after the explicit transfer of the calculated new MAC address, the packets arriving at the client device will be a mix of downlink packets transmitted by the AP using the old MAC address and downlink packets transmitted by the AP using the new MAC address, and thus the downlink packet referred to in Steps 406 and 407 should be understood as the downlink data packet transmitted using the new MAC address of the client device that arrives at the client device for the first time, so that the time duration needed for packets (if any) transmitted from the AP to the client device using the old MAC address can be sufficiently correspond to the counted time duration after receipt of the downlink data packet.

It should be noted that as mentioned above, the old MAC address still needs to be maintained for the extended period of time since the completion of the calculation for the new MAC address. In order to determine when the maintaining can be stopped, the timer is started at Step 407 when the downlink data packet transmitted from the AP using the second MAC address of the client device in Step 406 is successfully received. Since the predefined duration of the timer is determined based on the historical information for the communications between the AP and the client, the expiration of the timer is an effective indication of the completion of transmissions from the AP using the old MAC address.

At Step 408, when it is determined that the timer expires and thus the extended period of time elapses, the client device can stop using the first MAC address of the client device for receiving the data packets from the AP. Afterwards, the client device only has to maintain the second MAC address of the client device for the second communication.

It should be noted that the historical information for the transmissions between the client device and the AP can be determined at the client device, or the AP, or both. In case that the historical information is determined by the AP based on the round-trip time for downlink data packets, it can be sent to the client device in Step 402, or Step 406, or both. Preferably, the historical information is transmitted in Step 406, which informs the up-to-date transmission delay within the network environment to be used for the time counting. In case that the historical information is determined by the client device itself based on the round-trip time for uplink data packets, the determination can be performed at any time before the timer is configured with the predefined value and started to count for this value. In other cases, the historical information can be determined based on a combination of the round-trip time for downlink and uplink data packets.

Figure 5:
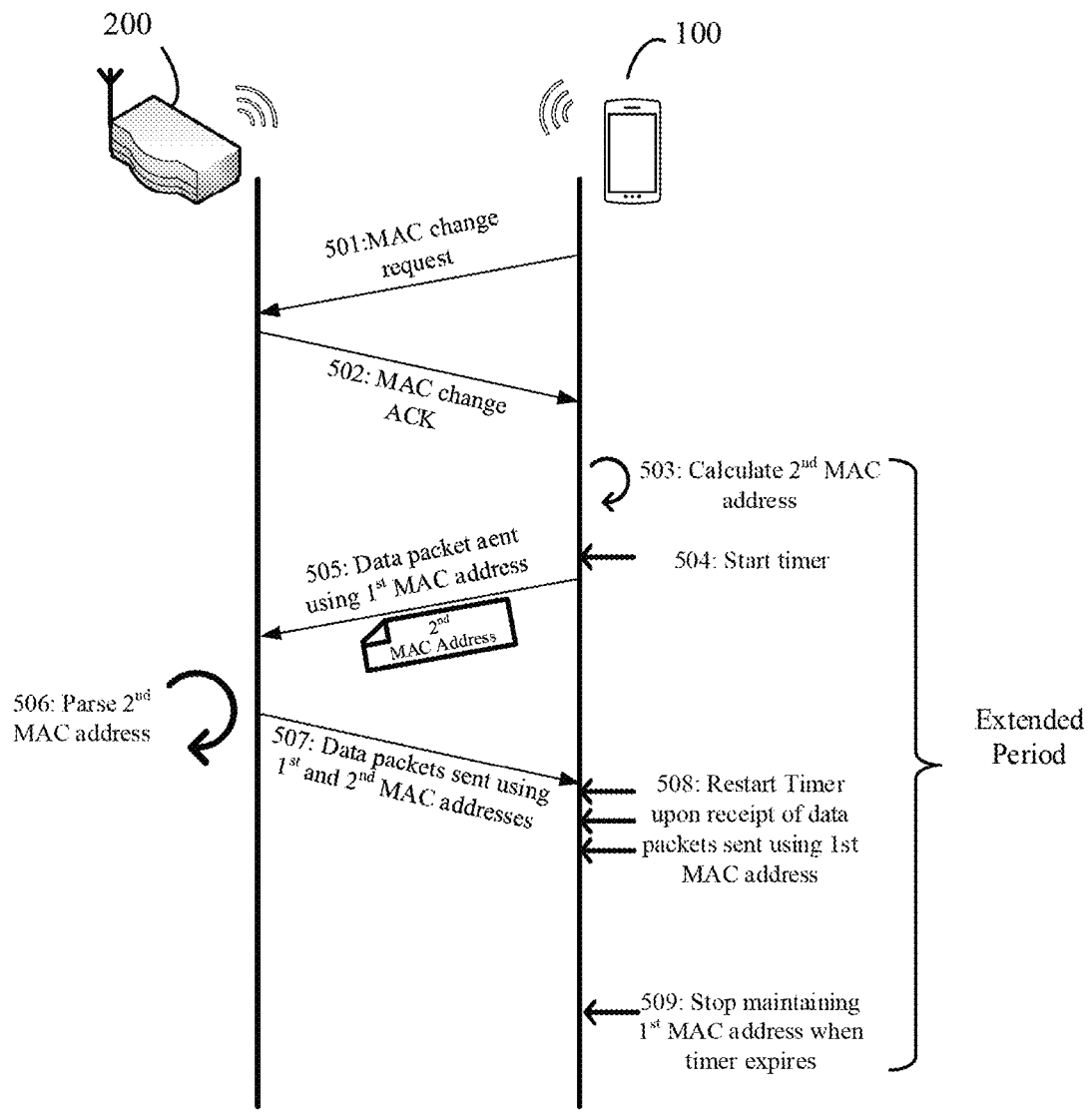
FIG. 5 shows an exemplary schematic diagram illustrating another example of interactions between client device and AP for changing the MAC address of the client device for ensuring its privacy according to an embodiment of the present disclosure.

FIG. 5 shows an exemplary schematic diagram illustrating another example of interactions between client device 100 and AP 200 for changing the MAC address of the client device for ensuring its privacy according to an embodiment of the present disclosure.

In this example, the client device can also be pre-configured with a timer for determining whether the extended period of time elapses. It should be noted that most operations for FIG. 4 and FIG. 5 are the same, and details for the same operations are omitted herein for conciseness. The operations of the timer are different between FIG. 4 and FIG. 5, and will be described hereinafter in combination with FIG. 5.

Steps 501-503 and Step 506 of FIG. 5 are basically the same as Steps 401-405 of FIG. 4, and the details may refer to those of FIG. 4.

At Step 504, different than the timer started upon receipt of the downlink packet using the new MAC address as shown at Step 407 of FIG. 4, the timer may be started after at the beginning of the communicating with the AP using the second MAC address of the client device. For example, the timer may be started a certain time after calculation of the second MAC address, such as synchronized with the transmission of the data packet transmitted using the first MAC address and carrying the content of the second MAC address in Step 505, shortly before or shortly after the transmission in Step 505, which can be flexibly decided according to the actual requirements. In addition, the timer can be restarted whenever a data packet transmitted from the AP using the first MAC address of the client device is received, which indicates that the transmission of the packets transmitted using the old MAC address has not ended.

At Step 507, as mentioned above, for a certain short period after the explicit transfer of the calculated new MAC address, the packets arriving at the client device will be a mix of downlink packets transmitted by the AP using the old MAC address and downlink packets transmitted by the AP using the new MAC address.

At Step 508, the timer can be restarted several times as depicted by the arrows, upon receipt of a data packet transmitted using the first MAC address of the client device, such that it can be determined that the maintaining for the old MAC address of the client device can be stopped only when the timer finally expires.

At Step 509, when it is determined that the timer expires and thus the extended period of time elapses, the client device can stop using the first MAC address of the client device for receiving the data packets from the AP. Afterwards, the client device only has to maintain the second MAC address of the client device for the second communication.

Figure 6:
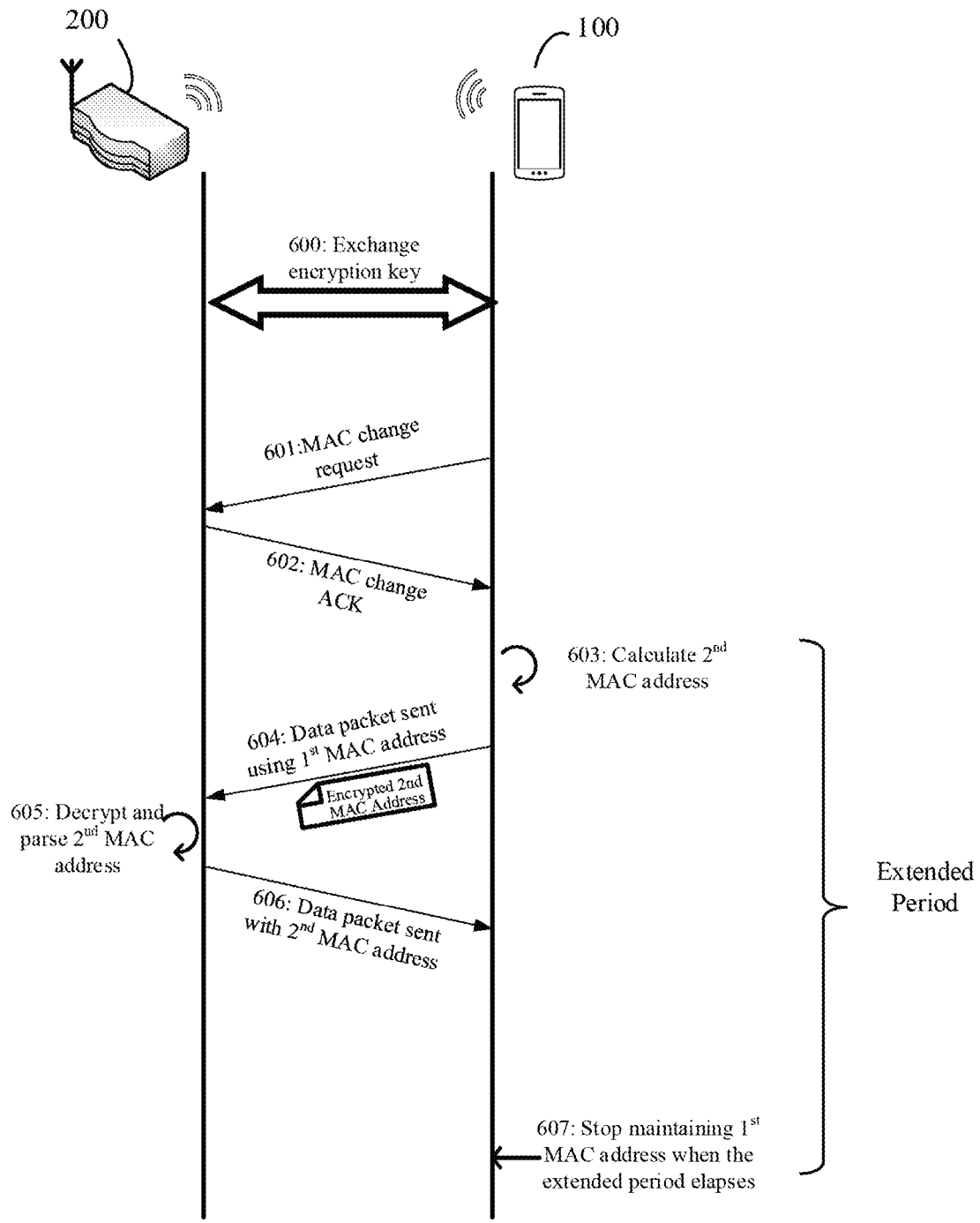
FIG. 6 shows an exemplary schematic diagram illustrating yet another example of interactions between client device and AP for changing the MAC address of the client device for ensuring its privacy according to an embodiment of the present disclosure.

FIG. 6 shows an exemplary schematic diagram illustrating yet another example of interactions between client device 100 and AP 200 for changing the MAC address of the client device for ensuring its privacy according to an embodiment of the present disclosure.

In this example, there is an optional step of exchange of encryption key between the client device and the AP, such that the calculated new MAC address can be encrypted before transmission and avoids security issues that may otherwise occur if the new MAC address is transmitted in plaintext and the privacy cannot be ensured. It should be noted that the details for the operations similar to those of FIG. 4 and FIG. 5 are omitted herein.

At Step 60), the client device may exchange an encryption key with the AP on a periodic basis for encrypting the second MAC address of the client device carried in the uplink data packet. For example, the encryption key may inherit from an encryption key generated during the 4-way handshake stage of the association process. Preferably, the client device may exchange a separate encryption key with the AP dedicated for encrypting the second MAC address, such that the security for the second MAC address can be guaranteed during the transmission of the packet carrying the content of the second MAC address.

At Steps 601-602, the client may transmit a MAC change request to the AP, and the AP may transmit a feedback message acknowledging the request. At Step 603, the client device may calculate the second MAC address of the client. Details are omitted.

At Step 604, the client device may encrypt the second MAC address using a most recent encryption key exchanged between the client device and the AP, so that the second MAC address carried in the uplink data packet is encrypted and the security can be ensured during the transmission.

At Step 605, upon receipt of the uplink data frame sent from the client device using the first MAC address, the AP may process and parse the received packet, and particularly, decrypt the encrypted second MAC address using the encryption key exchanged most recently, so as to determine the second MAC address calculated by the client device and intended to be used by the client device for future communications with the AP.

At Step 606, after parsing the second MAC address, the AP may transmit a downlink data packet using the second MAC address of the client device, e.g., by setting the RA field of the downlink data packet as the parsed second MAC address, such that the client device may start communications with the AP using the second MAC address of the client device while continually using the first MAC address of the client device for receiving data packets from the AP for an extended period of time.

At Step 607, when it is determined that the extended period of time elapses based on the historical information for the transmissions between the AP and the client, the client device can stop using the first MAC address of the client device for receiving the data packets from the AP, for example based on the use of the timer as described above in combination with FIG. 4 and FIG. 5. For example, countdown timers can also be used and the maintaining of the old MAC address can be stopped when the timer counts to zero. Other approaches for determining when the maintaining of the old MAC address can be stopped are also contemplated in the present disclosure. Afterwards, the client device only has to maintain the second MAC address of the client device for the second communication.

It should be noted that both the exchange of the encryption key between the AP and the client device and the initiation of the MAC change process can be triggered on a periodic basis, but the two processes may be performed asynchronously. In addition, the two process can also be initiated on the user's own intentions. It is possible as long as the encryption key used for encrypting the second MAC address of the client device is always the most recent key exchanged between the AP and the client device.

According to the improved mechanism for changing MAC address of the client device of the present disclosure as described above, at least the following beneficial technical effects can be realized. For example, the extended period of time for continuing maintaining the old MAC address of the client device is determined based on the historical information for the transmissions between the AP and the client, which enables a good tradeoff between the transmission loss for packets transmitted using the old MAC address of the client device and the overhead for maintaining both MAC addresses valid. In addition, the improved mechanism of the present disclosure has a wide range of application scenarios and can meet the requirements of the 802.11 bi standard, which is expected to be used as a formalized and standardized MAC change process for ensuring the privacy for 802.11 stations at least due to its simplicity of the algorithm implementation and completeness and definiteness of the overall MAC address change process. Also, the improved mechanism of the present disclosure can be applied to all scenarios where the client device needs to change the MAC address to protect user information from being tracked, for example, when the user connects to the Wi-Fi networks in shopping malls, train stations, coffee shops, etc. Additionally, the improved mechanism for the MAC change of the present disclosure does not require significant changes to the existing 802.11 specification, but only needs to add some definitions for new or reserved fields of the control frame (e.g., to transmit the MAC change request), and thus can be easily compatible with the IEEE 802.11 specification, enabling simpler iterative upgrade, better compatibility and lower requirement for the AP.

For example, when the improved mechanism of the present disclosure is applied to the Wi-Fi network in some public places, e.g., applied in the communications between the client devices of users visiting the public places and AP located in these places, it may enable an efficient MAC change procedure. Assume that there are many mobile phones (e.g., hundreds of smart phones) connected to the AP in a shopping mall, it is preferable to change the MAC address of the mobile phones regularly to prevent information leakage. According to the present disclosure, the operations of calculation of the new MAC address, and the determination of whether to stop maintaining the old MAC address (e.g., the control and operation of related timers) are performed at the client device side, such that the overload can be offloaded from the AP (which may be a low-capability device or cannot handle excessive MAC change requests simultaneously) to the client device, thereby saving the resources at the AP for other aspects of calculations or operations.

Figure 7:
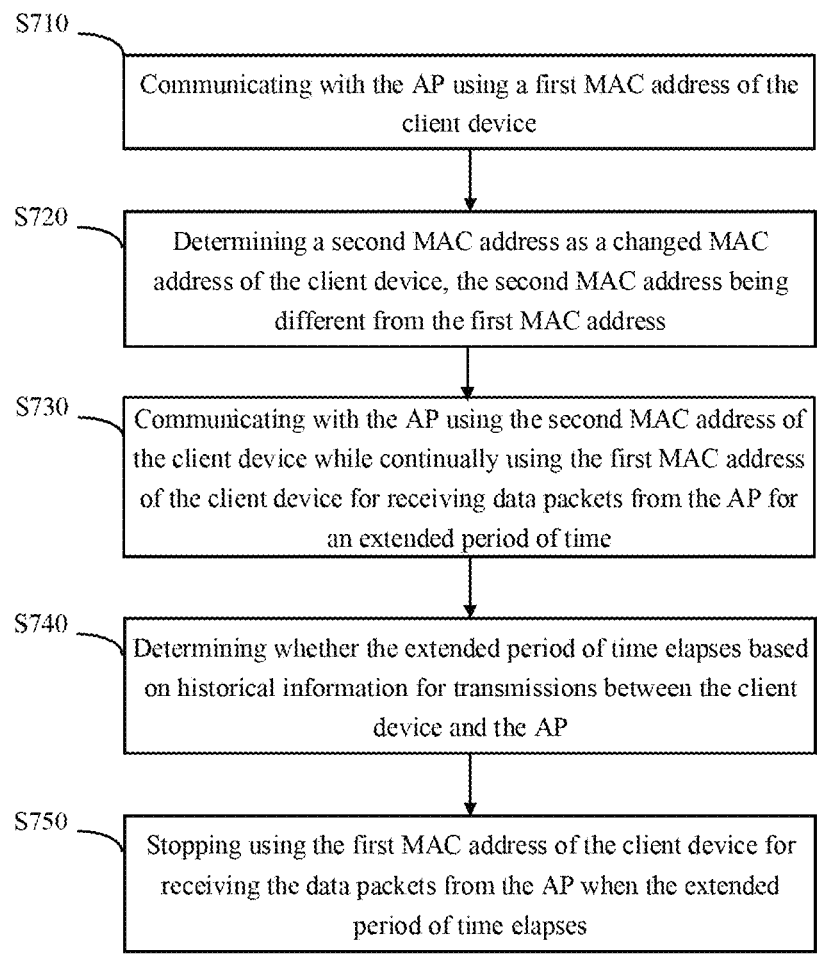
FIG. 7 shows a flowchart of a computer-implemented method of managing a media access control (MAC) address of a client device for communication with an access point (AP) according to an embodiment of the present disclosure.

FIG. 7 shows a flowchart of a computer-implemented method of managing a media access control (MAC) address of a client device for communication with an access point (AP) according to an embodiment of the present disclosure. The method may be implemented in the client device and the detailed description of method 700 can refer to the content described in the above with respect to FIGS. 1-6. For example, method 700 can be executed in the architecture described with respect to FIG. 1 and according to the interactions between the AP and the client device described with respect to FIGS. 2-6. In addition, each step of method 700 can be performed by one or more processing units, such as central processing unit (CPU) of the client device.

With reference to FIG. 7, method 700 comprises steps S710-S750.

At step S710, the client device may communicate with the AP using a first MAC address of the client device.

At step S720, the client device may determine a second MAC address as a changed MAC address of the client device, the second MAC address being different from the first MAC address.

According to an embodiment, the method further comprises: transmitting a request for changing the first MAC address of the client device to the AP during the communicating with the AP using the first MAC address of the client device. In this example, the second MAC address of the client device is determined after receipt of a feedback message from the AP acknowledging the request. For example, the second MAC address is a transient MAC address computed by the client device through MAC address randomization.

At step S730, the client device may communicate with the AP using the second MAC address of the client device while continually using the first MAC address of the client device for receiving data packets from the AP for an extended period of time.

According to an embodiment, the communicating with the AP using the second MAC address of the client device comprises: transmitting an uplink data packet to the AP using the first MAC address of the client device, the uplink data packet carrying the determined second MAC address; receiving a downlink data packet transmitted from the AP using the second MAC address of the client device, the downlink data packet being transmitted from the AP after parsing the second MAC address carried in the uplink data packet; and transmitting one or more subsequent uplink data packets to the AP using the second MAC address of the client device.

According to an embodiment, the method further comprises: exchanging an encryption key with the AP on a periodic basis for encrypting the second MAC address of the client device carried in the uplink data packet, and wherein: the second MAC address is encrypted by the client device using a most recent encryption key exchanged between the client device and the AP, and the encrypted second MAC address carried in the uplink data packet is decrypted by the AP using the most recent encryption key and used for transmitting the downlink data packet.

At step S740, the client device may determine whether the extended period of time elapses based on historical information for transmissions between the client device and the AP.

According to an embodiment, the determining whether the extended period of time elapses based on the historical information comprises: predicting a target time of when transmissions of data packets from the AP using the first MAC address of the client device will be completed based on the historical information; and determining that the extended period of time elapses when the target time is reached.

According to an embodiment, the method further comprises configuring a timer for determining whether the extended period of time elapses. In this embodiment, the timer is configured with a predefined duration determined based on the historical information and specifying a time interval before the timer expires, and the extended period of time elapses when it is determined that the timer expires.

In an example of this embodiment, the timer is started at the beginning of the communicating with the AP using the second MAC address of the client device, and restarted whenever a data packet transmitted from the AP using the first MAC address of the client device is received, and the timer expires when the predefined duration is reached.

In another example of this embodiment, the timer is started when a data packet transmitted from the AP using the second MAC address of the client device is received, and the timer expires when the predefined duration is reached.

According to another embodiment, the historical information can be determined based on historical total transmission length (TTL) information for one or more downlink or uplink data packets communicated between the AP and the client device.

In an example of this embodiment, the historical information is representative of historical total transmission length (TTL) information for one or more downlink data packets transmitted from the AP to the client device. The TTL information comprises: for each of the one or more downlink data packets, a time difference between a transmission time of the downlink data packet from the AP towards the client device and a receipt time of a feedback information acknowledging the downlink data packet at the AP from the client device. In this example, determining whether the extended period of time elapses is based on an average of the time differences for the one or more downlink data packets. For example, the historical information is determined by the AP and transmitted from the AP to the client device in the downlink data packet or in the feedback message described above.

In another example of this embodiment, the historical information is representative of historical total transmission length (TTL) information for one or more uplink data packets transmitted from the client device to the AP. The TTL information comprises: for each of the one or more uplink data packets, a time difference between a transmission time of the uplink data packet from the client device towards the AP and a receipt time of a feedback information acknowledging the uplink data packet at the client device from the AP. In this example, determining whether the extended period of time elapses is based on an average of the time differences for the one or more uplink data packets.

At step S750, the client device may stop using the first MAC address of the client device for receiving the data packets from the AP when the extended period of time elapses.

At least based on the above embodiments of the present disclosure, an improved mechanism for managing the MAC address of the client device can be realized while ensuring the privacy of the client device and effectively mitigating the packet loss for communication between the client device and its serving AP.

Figure 8:
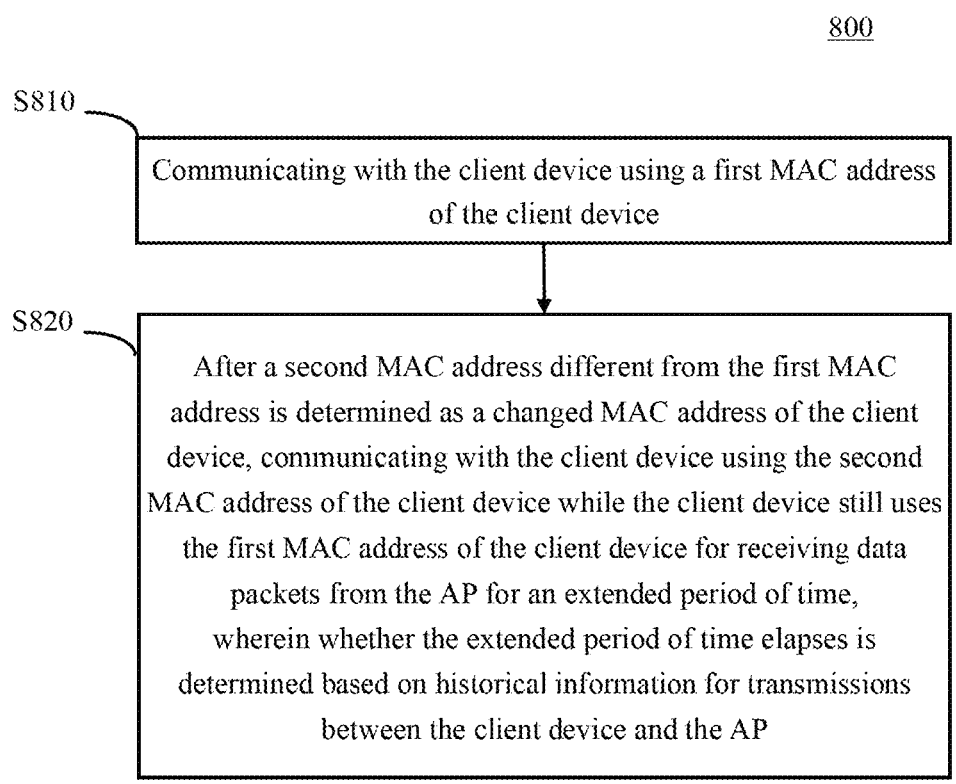
FIG. 8 shows a flowchart of a computer-implemented method of managing a media access control (MAC) address of a client device and being implemented in an access point (AP) according to another embodiment of the present disclosure.

FIG. 8 shows a flowchart of a computer-implemented method of managing a media access control (MAC) address of a client device and being implemented in an access point (AP) according to another embodiment of the present disclosure. The detailed description of method 800 can refer to the content described in the above with respect to FIGS. 1-6. For example, method 800 can be executed in the architecture described with respect to FIG. 1 and according to the interactions between the AP and the client device described with respect to FIGS. 2-6. In addition, each step of method 800 can be performed by one or more processing units, such as central processing unit (CPU) of the AP.

With reference to FIG. 8, method 800 comprises steps S810-S820.

At step S810, the AP may communicate with the client device using a first MAC address of the client device.

At step S820, the AP may, after a second MAC address different from the first MAC address is determined as a changed MAC address of the client device, communicate with the client device using the second MAC address of the client device. According to embodiments of the present disclosure, after the second MAC address is determined as the changed MAC address of the client device, the client device continually uses the first MAC address of the client device for receiving data packets from the AP for an extended period of time, and whether the extended period of time elapses is determined based on historical information for transmissions between the client device and the AP.

According to an embodiment, the historical information is representative of historical total transmission length (TTL) information for one or more downlink data packets transmitted from the AP to the client device, and wherein the TTL information comprises: for each of the one or more downlink data packets, a time difference between a transmission time of the downlink data packet from the AP towards the client device and a receipt time of a feedback information acknowledging the downlink data packet at the AP from the client device, and wherein whether the extended period of time elapses is determined based on an average of the time differences for the one or more downlink data packets.

According to another embodiment, the historical information is representative of historical total transmission length (TTL) information for one or more uplink data packets transmitted from the client device to the AP, and wherein the TTL information comprises: for each of the one or more uplink data packets, a time difference between a transmission time of the uplink data packet from the client device towards the AP and a receipt time of a feedback information acknowledging the uplink data packet at the client device from the AP, and wherein whether the extended period of time elapses is determined based on an average of the time differences for the one or more uplink data packets.

According to yet another embodiment, the communicating with the client device using the second MAC address of the client device comprises: receiving an uplink data packet from the client device, the uplink data packet transmitted using the first MAC address of the client device and carrying the second MAC address; parsing the second MAC address carried in the uplink data packet; transmitting a downlink data packet to the client device using the second MAC address of the client device; and receiving one or more subsequent uplink data packets from the client device, the one or more subsequent uplink data packets using the second MAC address of the client device.

In this embodiment, the method further comprises: exchanging an encryption key with the client device on a periodic basis for encrypting the second MAC address of the client device carried in the uplink data packet, wherein the second MAC address is encrypted by the client device using a most recent encryption key exchanged between the client device and the AP, and decrypting the encrypted second MAC address carried in the uplink data packet using the most recent encryption key, and wherein the decrypted second MAC address is used for transmitting the downlink data packet.

According to yet another embodiment, the method further comprises: receiving a request for changing the first MAC address of the client device from the client device during the communicating with the client device using the first MAC address of the client device; transmitting a feedback message to the client device acknowledging the request, and wherein the second MAC address of the client device is determined after receipt of the feedback message.

According to the above embodiments, the historical information is determined by the AP and transmitted from the AP to the client device in the downlink data packet. Additionally or alternatively, the historical information is determined by the AP and transmitted from the AP to the client device in the feedback message.

At least based on the above embodiments of the present disclosure, an improved mechanism for managing the MAC address of the client device can be realized while ensuring the privacy of the client device and effectively mitigating the packet loss for communication between the client device and its serving AP.

Figure 9:
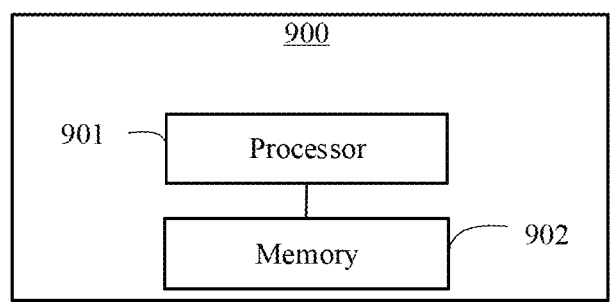
FIG. 9 is an exemplary block diagram illustrating a computing device according to embodiments of the disclosure.

FIG. 9 is an exemplary block diagram illustrating a computing device according to embodiments of the disclosure. It should be noted that the computing device depicted in FIG. 9 can correspond to one or more of the client device and the AP as described and can be used to perform the operations of managing the MAC address of the client device, for example, respective method 700 or method 800 as described above.

As shown in FIG. 9, the computing device 900 can comprise processor 901 and memory 902. The processor 901 is communicatively coupled with the memory and configured to perform the methods discussed above.

Examples of the processor 901 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 901 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 902.

The memory 902 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 902 may reside in the processor 901, external to the processor 901, or distributed across multiple entities including the processor 901. The memory 902 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for managing a media access control (MAC) address of a client device for communication with an access point (AP) is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on" or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims "including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method of managing a media access control (MAC) address of a client device for communication with an access point (AP), the method implemented in the client device and comprising:
    communicating with the AP using a first MAC address of the client device;
    determining a second MAC address as a changed MAC address of the client device, the second MAC address being different from the first MAC address;
    communicating with the AP using the second MAC address of the client device while continually using the first MAC address of the client device for receiving data packets from the AP for an extended period of time;
    determining whether the extended period of time elapses based on historical information for transmissions between the client device and the AP; and
    stopping using the first MAC address of the client device for receiving the data packets from the AP when the extended period of time elapses.

2. The method of claim 1, wherein the determining whether the extended period of time elapses based on the historical information comprising:
    predicting a target time of when transmissions of data packets from the AP using the first MAC address of the client device will be completed based on the historical information; and
    determining that the extended period of time elapses when the target time is reached.

3. The method of claim 1, further comprising configuring a timer for determining whether the extended period of time elapses, wherein:
    the timer is configured with a predefined duration determined based on the historical information and specifying a time interval before the timer expires, and
    wherein the extended period of time elapses when it is determined that the timer expires.

4. The method of claim 3, wherein:
    the timer is started at the beginning of the communicating with the AP using the second MAC address of the client device, and restarted whenever a data packet transmitted from the AP using the first MAC address of the client device is received, and
    the timer expires when the predefined duration is reached.

5. The method of claim 3, wherein:
    the timer is started when a data packet transmitted from the AP using the second MAC address of the client device is received, and
    the timer expires when the predefined duration is reached.

6. The method of claim 1, wherein the historical information is representative of historical total transmission length (TTL) information for one or more downlink data packets transmitted from the AP to the client device, and
    wherein the TTL information comprises: for each of the one or more downlink data packets, a time difference between a transmission time of the downlink data packet from the AP towards the client device and a receipt time of a feedback information acknowledging the downlink data packet at the AP from the client device, and
    wherein determining whether the extended period of time elapses is based on an average of the time differences for the one or more downlink data packets.

7. The method of claim 1, wherein the historical information is representative of historical total transmission length (TTL) information for one or more uplink data packets transmitted from the client device to the AP, and
    wherein the TTL information comprises: for each of the one or more uplink data packets, a time difference between a transmission time of the uplink data packet from the client device towards the AP and a receipt time of a feedback information acknowledging the uplink data packet at the client device from the AP, and
    wherein determining whether the extended period of time elapses is based on an average of the time differences for the one or more uplink data packets.

8. The method of claim 1, wherein the communicating with the AP using the second MAC address of the client device comprises:
    transmitting an uplink data packet to the AP using the first MAC address of the client device, the uplink data packet carrying the determined second MAC address;
    receiving a downlink data packet transmitted from the AP using the second MAC address of the client device, the downlink data packet being transmitted from the AP after parsing the second MAC address carried in the uplink data packet; and
    transmitting one or more subsequent uplink data packets to the AP using the second MAC address of the client device.

9. The method of claim 8, further comprising:
    exchanging an encryption key with the AP on a periodic basis for encrypting the second MAC address of the client device carried in the uplink data packet, and wherein:

the second MAC address is encrypted by the client device using a most recent encryption key exchanged between the client device and the AP, and the encrypted second MAC address carried in the uplink data packet is decrypted by the AP using the most recent encryption key and used for transmitting the downlink data packet.

10. The method of claim 8, wherein the historical information is determined by the AP and transmitted from the AP to the client device in the downlink data packet.

11. The method of claim 1, further comprising:

transmitting a request for changing the first MAC address of the client device to the AP during the communicating with the AP using the first MAC address of the client device;

wherein the second MAC address of the client device is determined after receipt of a feedback message from the AP acknowledging the request.

12. The method of claim 11, wherein the historical information is determined by the AP and transmitted from the AP to the client device in the feedback message.

13. The method of claim 1, wherein the second MAC address is a transient MAC address computed by the client device through MAC address randomization.

14. A method of managing a media access control (MAC) address of a client device, the method implemented in an access point (AP) and comprising:

communicating with the client device using a first MAC address of the client device;

after a second MAC address different from the first MAC address is determined as a changed MAC address of the client device, communicating with the client device using the second MAC address of the client device while the client device continually uses the first MAC address of the client device for receiving data packets from the AP for an extended period of time, wherein whether the extended period of time elapses is determined based on historical information for transmissions between the client device and the AP.

15. The method of claim 14, wherein the historical information is representative of historical total transmission length (TTL) information for one or more downlink data packets transmitted from the AP to the client device, and wherein the TTL information comprises: for each of the one or more downlink data packets, a time difference between a transmission time of the downlink data packet from the AP towards the client device and a receipt time of a feedback information acknowledging the downlink data packet at the AP from the client device, and wherein whether the extended period of time elapses is determined based on an average of the time differences for the one or more downlink data packets.

16. The method of claim 14, wherein the historical information is representative of historical total transmission length (TTL) information for one or more uplink data packets transmitted from the client device to the AP, and wherein the TTL information comprises: for each of the one or more uplink data packets, a time difference between a transmission time of the uplink data packet from the client device towards the AP and a receipt time of a feedback information acknowledging the uplink data packet at the client device from the AP, and wherein whether the extended period of time elapses is determined based on an average of the time differences for the one or more uplink data packets.

17. The method of claim 14, wherein the communicating with the client device using the second MAC address of the client device comprising:

receiving an uplink data packet from the client device, the uplink data packet transmitted using the first MAC address of the client device and carrying the second MAC address;

parsing the second MAC address carried in the uplink data packet;

transmitting a downlink data packet to the client device using the second MAC address of the client device; and receiving one or more subsequent uplink data packets from the client device, the one or more subsequent uplink data packets using the second MAC address of the client device.

18. The method of claim 17, further comprising:

exchanging an encryption key with the client device on a periodic basis for encrypting the second MAC address of the client device carried in the uplink data packet, wherein the second MAC address is encrypted by the client device using a most recent encryption key exchanged between the client device and the AP, and decrypting the encrypted second MAC address carried in the uplink data packet using the most recent encryption key, and wherein the decrypted second MAC address is used for transmitting the downlink data packet.

19. The method of claim 14, further comprising:

receiving a request for changing the first MAC address of the client device from the client device during the communicating with the client device using the first MAC address of the client device;

transmitting a feedback message to the client device acknowledging the request, and wherein the second MAC address of the client device is determined after receipt of the feedback message.

20. A client device managing a media access control (MAC) address for communication with an access point (AP), the client device comprising:

one or more processors;

a memory coupled to at least one of the processors; and a set of computer program instructions stored in the memory, which, when executed by at least one of the processors, perform actions of:

communicating with the AP using a first MAC address of the client device;

determining a second MAC address as a changed MAC address of the client device, the second MAC address being different from the first MAC address;

communicating with the AP using the second MAC address of the client device while continually using the first MAC address of the client device for receiving data packets from the AP for an extended period of time;

determining whether the extended period of time elapses based on historical information for transmissions between the client device and the AP; and stopping using the first MAC address of the client device for receiving the data packets from the AP when the extended period of time elapses.

* * * * *